United States Patent
Oshiro

(10) Patent No.: US 11,492,984 B2
(45) Date of Patent: Nov. 8, 2022

(54) THROTTLE OPERATING DEVICE

(71) Applicant: ASAHI DENSO CO., LTD., Shizuoka (JP)

(72) Inventor: Yukio Oshiro, Hamamatsu (JP)

(73) Assignee: ASAHI DENSO CO., LTD., Shizuoka (JP)

( * ) Notice: Subject to any disclaimer, the term of this patent is extended or adjusted under 35 U.S.C. 154(b) by 0 days.

(21) Appl. No.: 17/539,859

(22) Filed: Dec. 1, 2021

(65) Prior Publication Data
US 2022/0178313 A1 Jun. 9, 2022

(30) Foreign Application Priority Data
Dec. 4, 2020 (JP) .............................. JP2020-201992

(51) Int. Cl.
*F02D 11/00* (2006.01)
*F02D 11/02* (2006.01)
*F02D 9/02* (2006.01)

(52) U.S. Cl.
CPC ................ F02D 11/02 (2013.01); F02D 9/02 (2013.01); *F02D 2009/0254* (2013.01)

(58) Field of Classification Search
CPC ..... F02D 9/02; F02D 2009/0254; F02D 11/02
See application file for complete search history.

(56) References Cited

U.S. PATENT DOCUMENTS

| | | | | |
|---|---|---|---|---|
| 2,438,718 A | * | 3/1948 | Lipfert | F02D 9/00 137/481 |
| D591,652 S | * | 5/2009 | Reed | D12/174 |
| 10,450,968 B2 | * | 10/2019 | Bernier | B62M 9/06 |
| 10,850,795 B2 | * | 12/2020 | Oshiro | F02D 11/02 |
| 11,204,617 B2 | * | 12/2021 | Okamoto | B63H 21/213 |
| 2004/0065165 A1 | * | 4/2004 | Sekiya | F02D 11/02 74/491 |
| 2007/0193396 A1 | * | 8/2007 | Schlabach | G05G 1/30 74/512 |
| 2010/0038166 A1 | * | 2/2010 | Chandran | B60K 26/02 180/335 |
| 2010/0043589 A1 | * | 2/2010 | Chandran | B62K 11/14 74/504 |
| 2010/0057322 A1 | * | 3/2010 | Chandran | B62K 23/04 701/101 |
| 2011/0162478 A1 | * | 7/2011 | Suzuki | G05G 1/04 74/504 |
| 2011/0303041 A1 | * | 12/2011 | Cheng | B62J 45/422 338/199 |

(Continued)

FOREIGN PATENT DOCUMENTS

JP 2010-053836 A 3/2010

*Primary Examiner* — Sizo B Vilakazi
*Assistant Examiner* — Sherman D Manley
(74) *Attorney, Agent, or Firm* — Pearne & Gordon LLP

(57) ABSTRACT

A throttle operating device includes a fixing member, a throttle lever, the throttle lever, a magnet which is configured to rotate in response to a rotational operation of the throttle lever, and a detection sensor. A drive source of the vehicle is configured to be controlled based on the rotational operation angle of the throttle lever detected by the detection sensor. A magnetic shielding unit is disposed in the fixing member and configured to cover a periphery of the magnet and the detection sensor to shield magnetism from the outside.

9 Claims, 19 Drawing Sheets

(56) References Cited

U.S. PATENT DOCUMENTS

| | | | | |
|---|---|---|---|---|
| 2012/0111137 A1* | 5/2012 | Bliss | ............... | B62K 23/04 |
| | | | | 74/504 |
| 2015/0183321 A1* | 7/2015 | Lefebvre | ............ | B62K 23/06 |
| | | | | 180/334 |
| 2019/0283834 A1* | 9/2019 | Nishi | ................ | B62J 23/00 |
| 2021/0252688 A1* | 8/2021 | Nyberg | ............ | A01G 3/062 |

* cited by examiner

THROTTLE OPERATING DEVICE

CROSS-REFERENCE TO RELATED APPLICATIONS

This application is based on and claims priority under 35 USC 119 from Japanese Patent Application No. 2020-201992 filed on Dec. 4, 2020.

TECHNICAL FIELD

The present disclosure relates to a throttle operating device capable of controlling a drive source of a vehicle based on a rotational operation angle of a throttle lever detected by a detection sensor.

BACKGROUND ART

As a throttle operating device of the related art for operating a throttle opening in a vehicle such as an ATV and a four-wheel buggy, for example, as disclosed in JP-A-2010-53836, a device provided with a throttle lever (thumb throttle lever) attached to a vicinity of a grip are mentioned. Such a throttle operating device of the related art is configured so that when a finger of the driver's hand holding the grip is extended to the throttle lever and a rotation operation is performed, a detection sensor can detect a rotational operation angle and control an engine of the vehicle.

However, in the above-described related art, the rotational operation angle of the throttle lever can be detected by detecting a magnetic change of a magnet rotating in response to the throttle lever by the detection sensor. Therefore, an influence of magnetism from the outside may cause the detection sensor to cause erroneous detection and there is a risk that the rotational operation angle of the throttle lever cannot be accurately detected.

SUMMARY

The present disclosure is made in view of such circumstances and an object of the present disclosure is to provide a throttle operating device which can suppress erroneous detection of a detection sensor due to the influence of magnetism from the outside and accurately detect a rotational operation angle of a throttle lever.

According to an aspect of the present disclosure, there is provided a throttle operating device including: a fixing member which is fixed to a vicinity of a grip formed at a tip of a handlebar of a vehicle; a throttle lever which is attached and extending from the fixing member, and the throttle lever being configured to be pivoted while the grip is gripped; a magnet which is configured to rotate in response to a rotational operation of the throttle lever; and a detection sensor configured to detect a rotational operation angle of the throttle lever based on a magnetic change of the magnet rotating in response to the throttle lever, in which: a drive source of the vehicle is configured to be controlled based on the rotational operation angle of the throttle lever detected by the detection sensor; and a magnetic shielding unit is disposed in the fixing member and configured to cover a periphery of the magnet and the detection sensor to shield magnetism from the outside.

DESCRIPTION OF EMBODIMENTS

Figure 1:
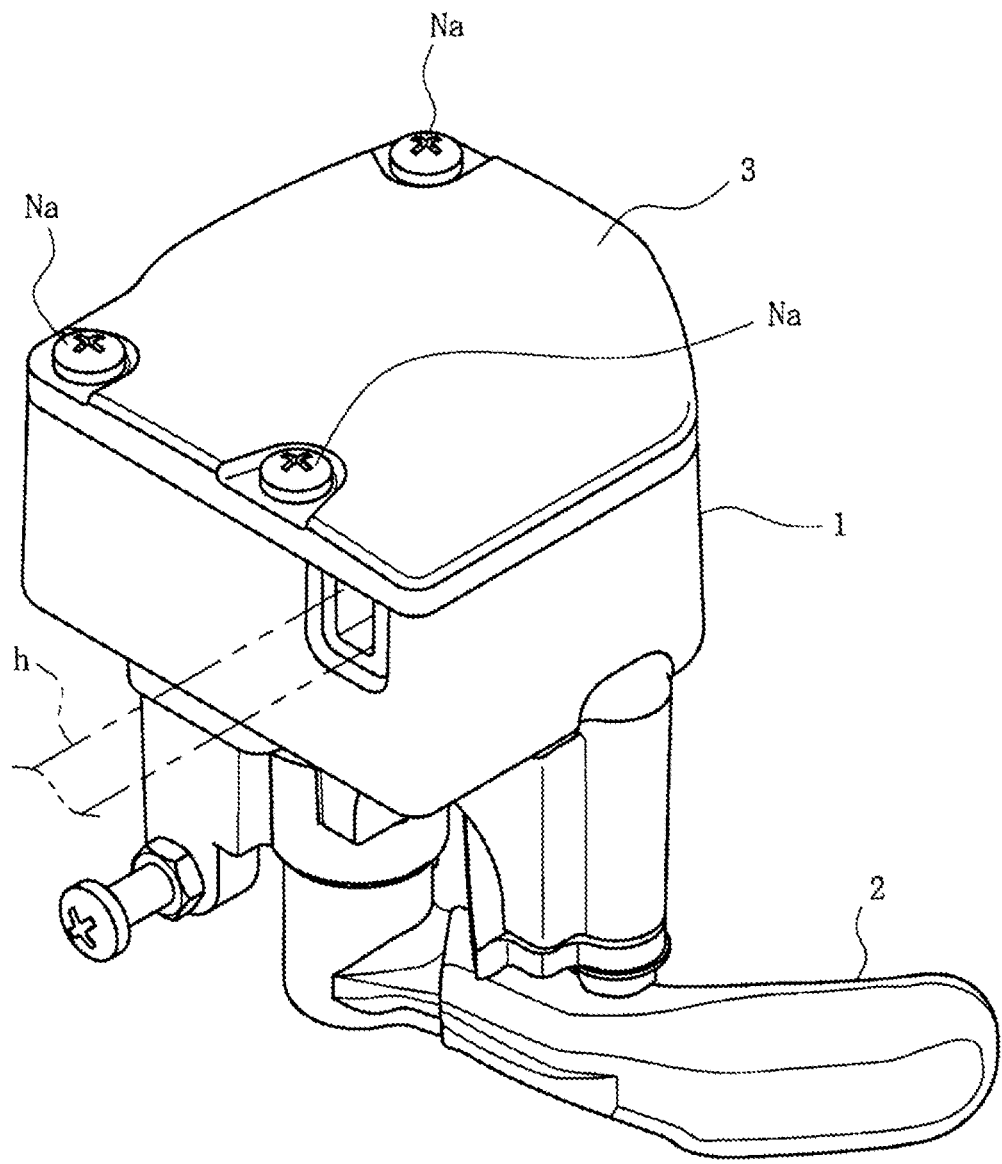
FIG. 1 is an overall perspective view illustrating a throttle operating device according to an embodiment of the present disclosure.

Hereinafter, embodiments of the invention will be specifically described with reference to the drawings.

A throttle operating device according to the present embodiment is fixed to a handlebar provided in a vehicle such as an ATV or a buggy so that an engine (drive source) of the vehicle can be controlled. As illustrated in FIGS. 1 to 5, the throttle operating device is configured to include a fixing member 1, a throttle lever 2 which is a so-called thumb lever, a cover member 3, a rotating member 5, a resistance force applying unit 7, a detection sensor 11, an accommodation case 13, magnetic shielding unit (14 and 15), a return spring S, and a magnet M.

Figure 6:
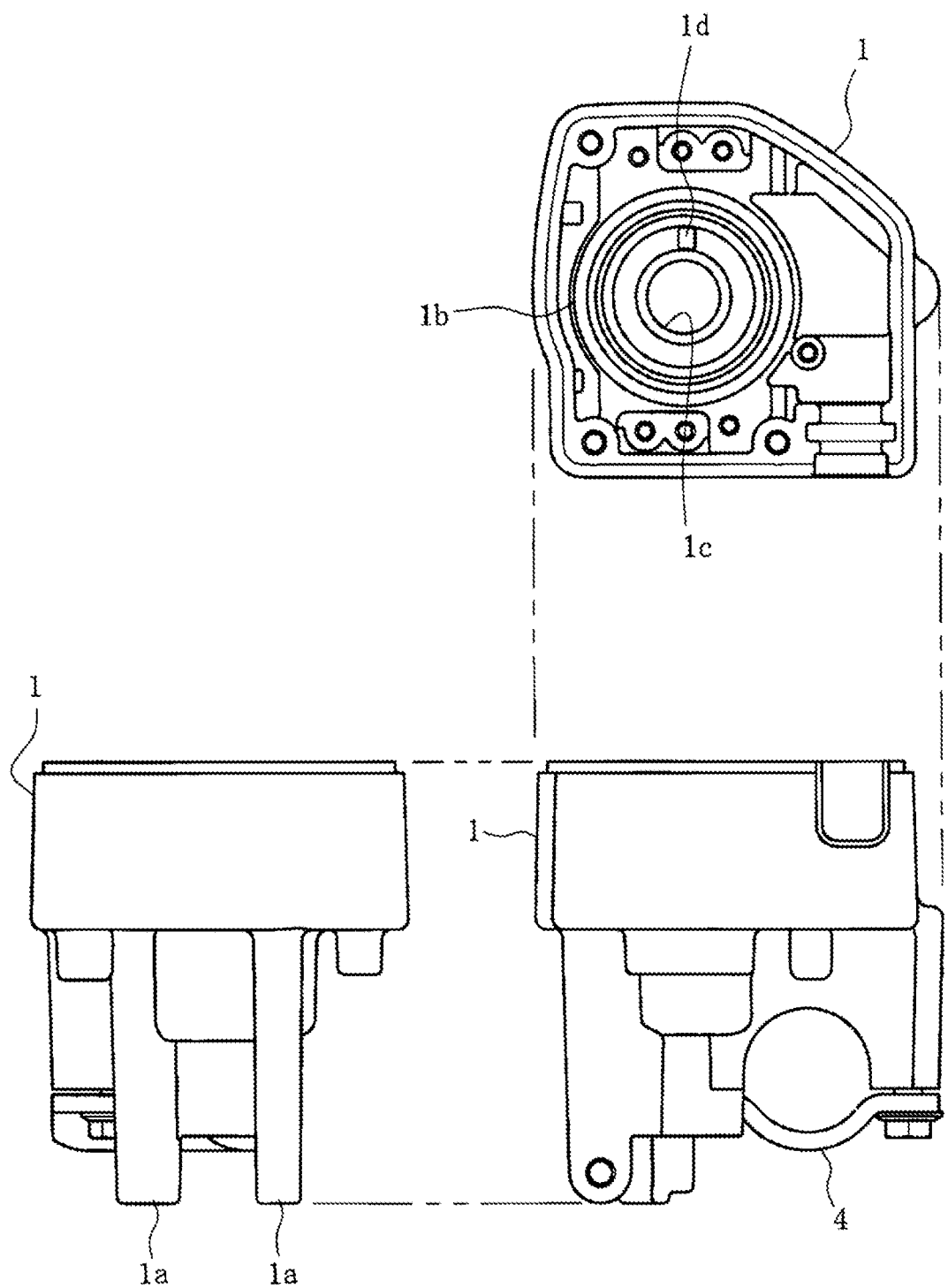
FIG. 6 is a three-view orthographic projection illustrating a fixing member of the throttle operating device.

The fixing member 1 is fixed to a handlebar H to pivotally support the throttle lever 2 and is fixed in a vicinity of a grip formed at a tip of the handlebar H of the vehicle. As illustrated in FIG. 6, the fixing member 1 has an opening at an upper side to form an accommodation recess portion inside and a holding member 4 is attached to the fixing member 1. The fixing member 1 can be fixed by holding the handlebar H with the holding member 4.

Further, the fixing member 1 is formed with a pair of regulating portions 1a-1a formed at a predetermined position on the outside thereof so as to be separated from each other by a predetermined dimension. Further, on a bottom surface of the accommodation recess portion formed inside, a mounting groove 1b for fitting and positioning a second sealing member 9b (see FIGS. 3 to 5), a through hole 1c through which a shaft member L is inserted to allow a rotational operation of the throttle lever 2, and a locking portion 1d for locking the other end Sb (see FIGS. 10 and 11) of the return spring S are formed. The cover member 3 is attached to the upper side of the fixing member 1. The cover member 3 is fixed by a mounting screw Na while covering an opening at the upper side of the fixing member 1.

Figure 2:
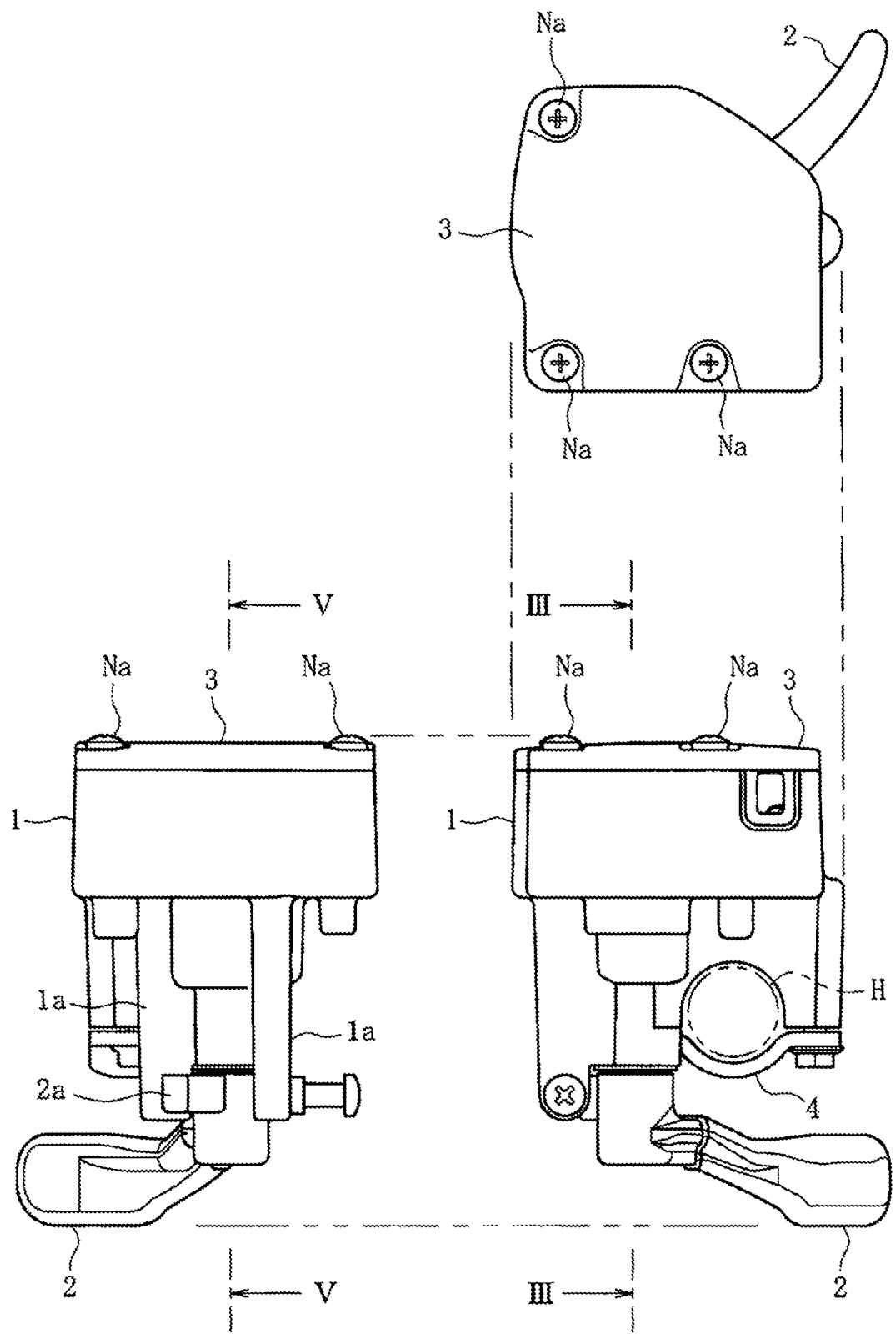
FIG. 2 is a three-view orthographic projection illustrating the throttle operating device.
Figure 3:
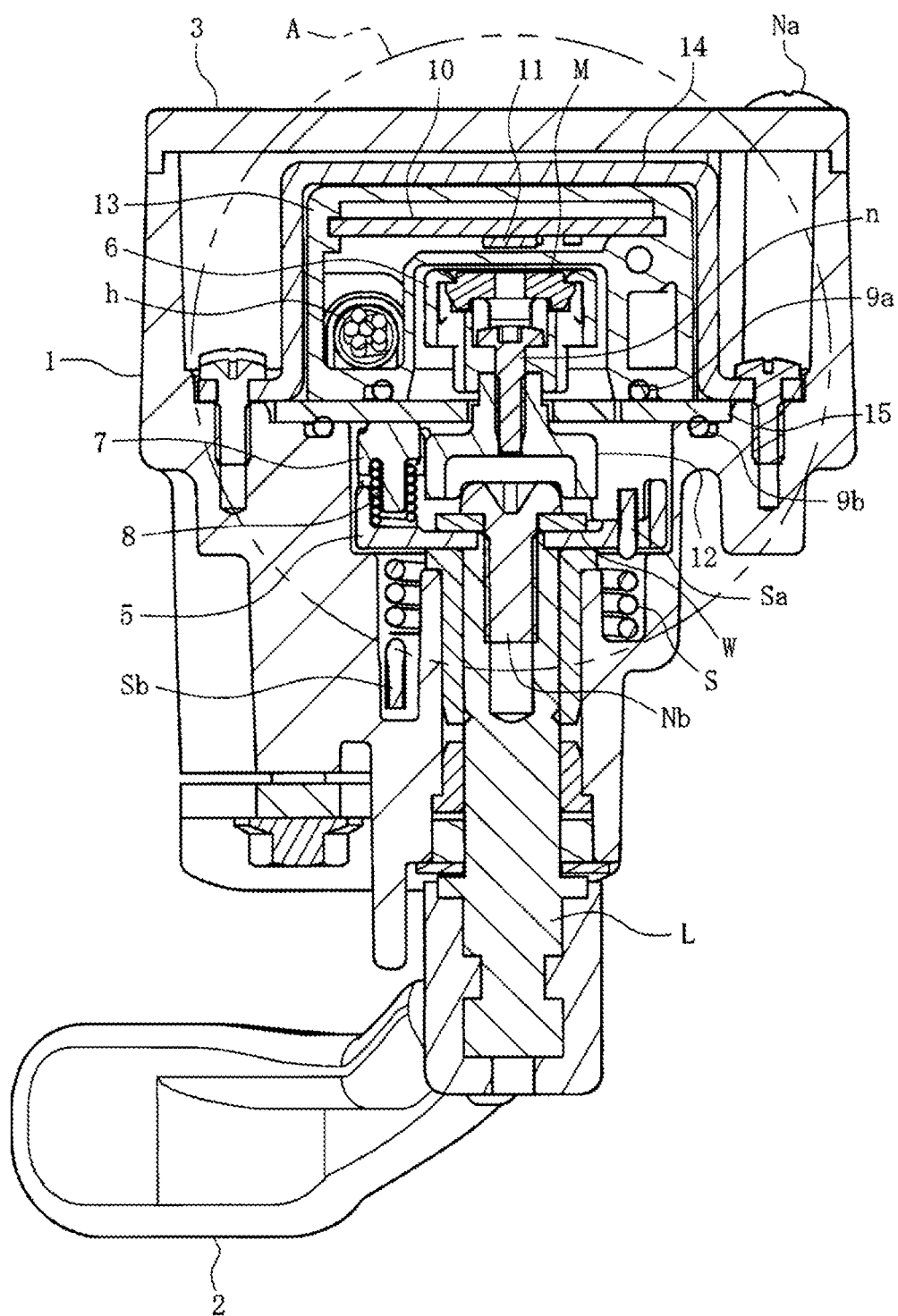
FIG. 3 is a cross-sectional view taken along the line of FIG. 2.
Figure 5:
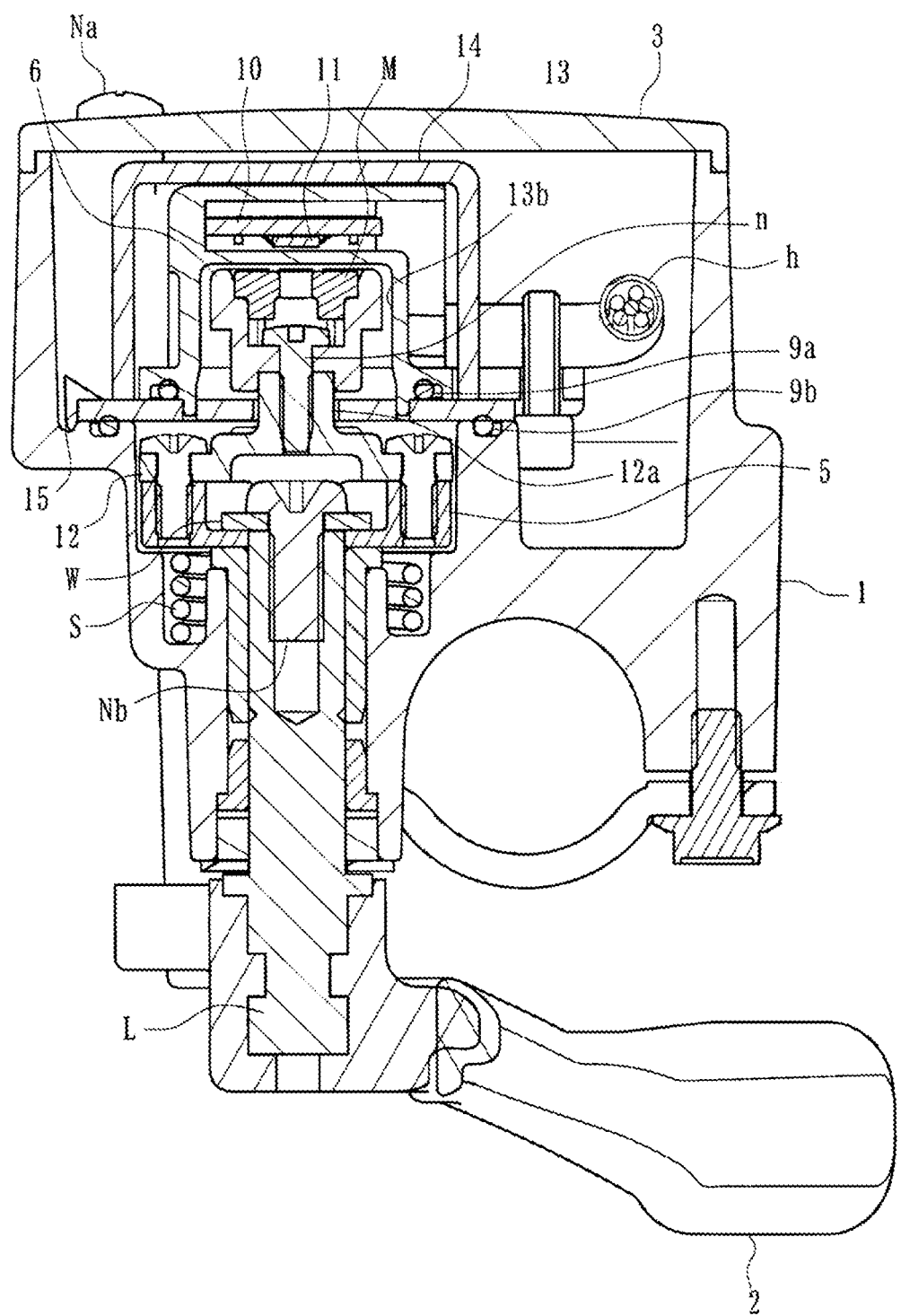
FIG. 5 is a cross-sectional view taken along the line V-V of FIG. 2.
Figure 9:
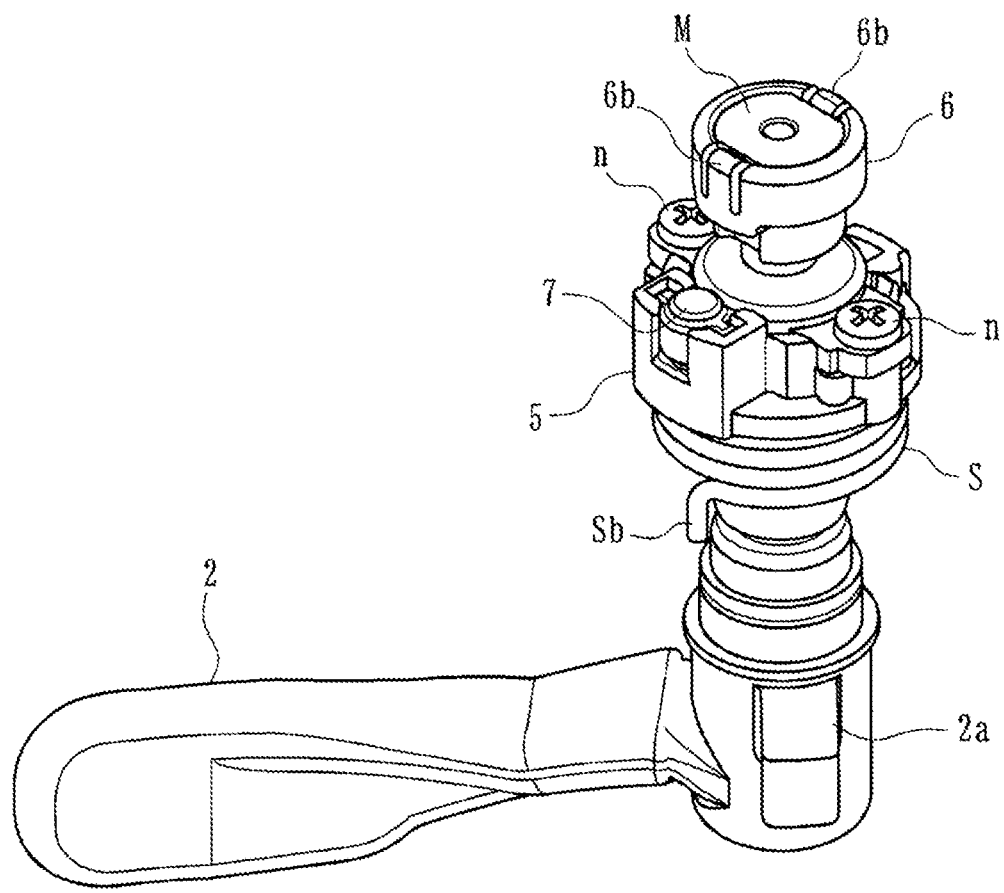
FIG. 9 is a perspective view illustrating a throttle lever of the throttle operating device and an integrated component which rotates together with the throttle lever.
Figure 10:
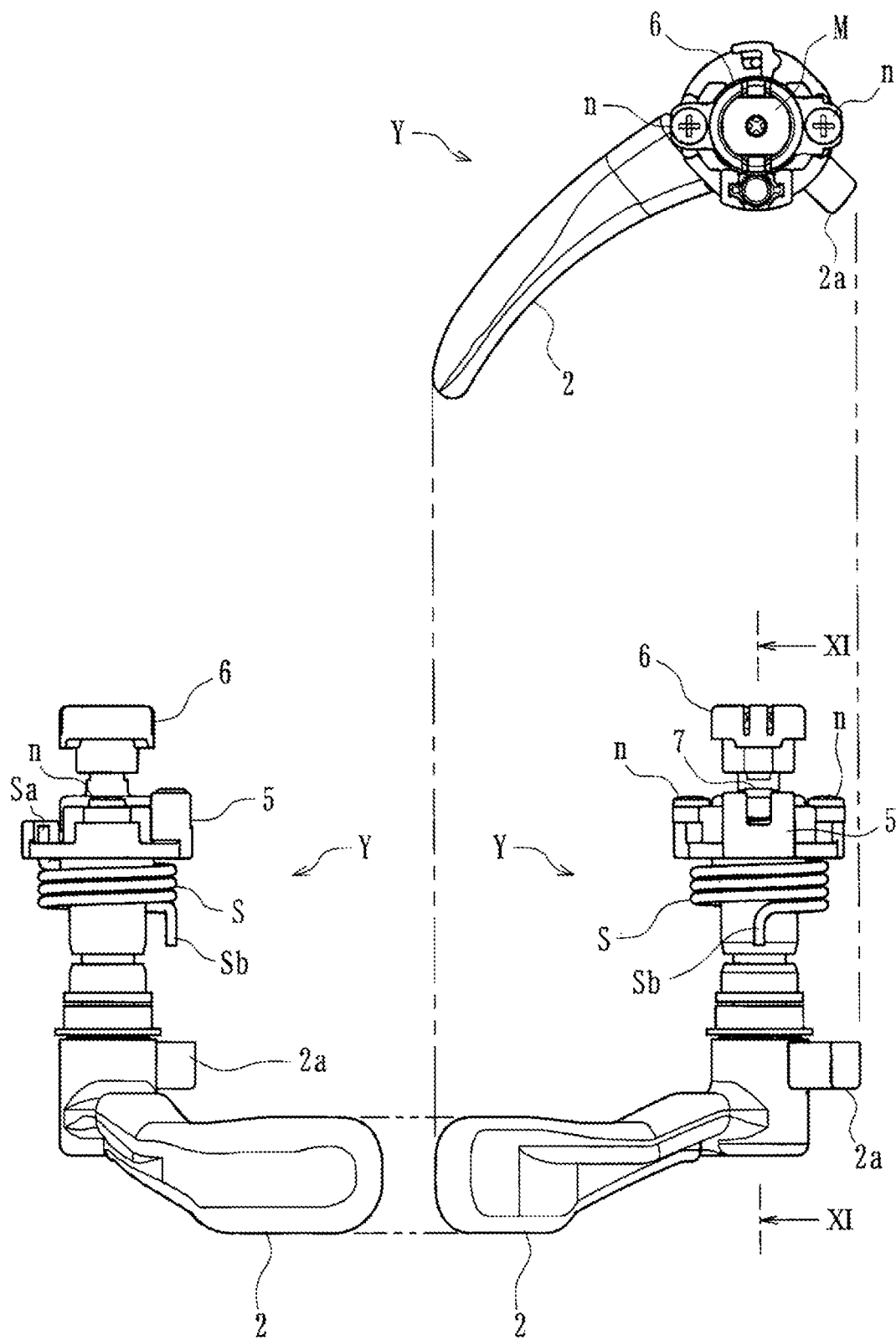
FIG. 10 is a three-view orthographic projection illustrating the throttle lever of the throttle operating device and the integrated component which rotates together with the throttle lever.

The throttle lever 2 is attached and extends from a lower side of the fixing member 1 so that a driver can pivot the throttle lever 2 while gripping the grip of the vehicle. As illustrated in FIGS. 3 and 5, the throttle lever 2 is connected to the shaft member L. The shaft member L rotates around a shaft in response to the rotational operation of the throttle lever 2 and the rotating member 5 is fixed to a tip of the shaft member L by a mounting screw Nb and a washer W. As illustrated in FIGS. 2, 9, and 10, the throttle lever 2 has a protruding portion 2a protruding laterally. The throttle lever 2 is configured such that the protruding portion 2a is located between the pair of regulating portions 1a-1a in a state of being assembled to the fixing member 1. As a result, rotation angles of the throttle lever 2 and the shaft member L are regulated within a predetermined range.

Figure 12:
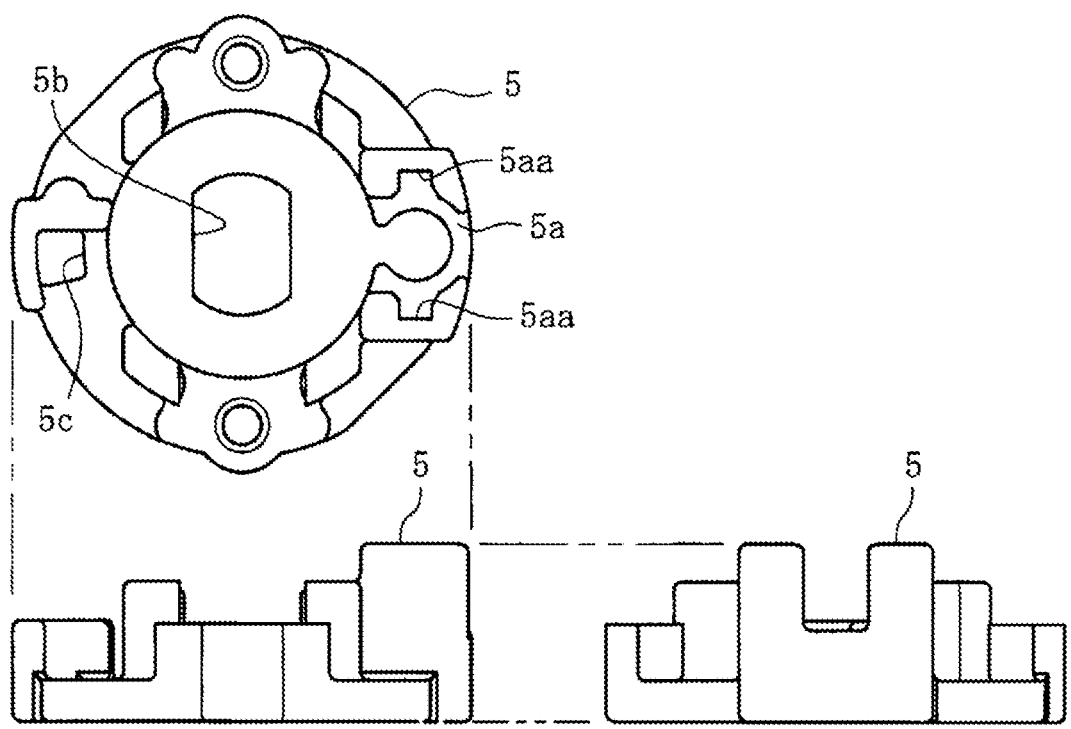
FIG. 12 is a three-view orthographic projection illustrating a rotating member of the throttle operating device.
Figure 13:
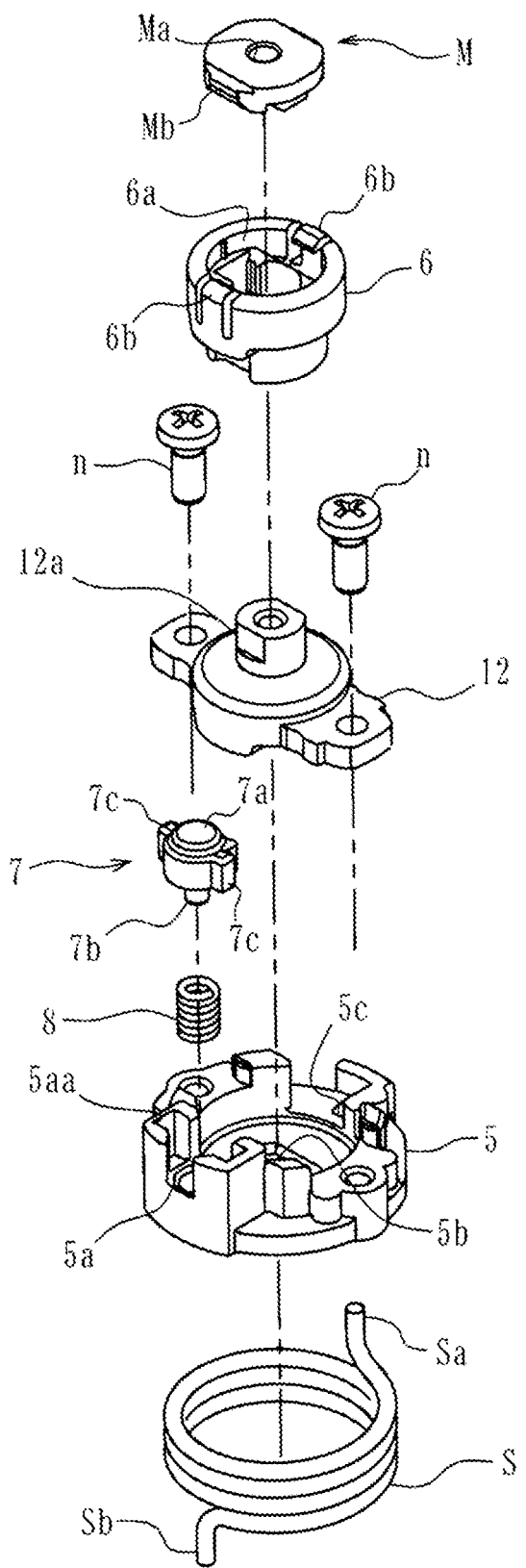
FIG. 13 is an exploded perspective view illustrating an assembled state of the integrated component of the throttle operating device.

The rotating member 5 is made rotatable in response to the rotational operation of the throttle lever 2. As illustrated in FIGS. 12 and 13, a mounting portion 5a to which the resistance force applying unit 7 and a coil spring 8 (see FIG. 13) can be attached, a through hole 5b through which a tip of the shaft member L can be inserted, a locking portions 5c for locking one end Sa (see FIGS. 11 and 13) of the return spring S are formed in the rotating member 5. However, the rotating member 5 is assembled so that one end Sa of the return spring S is locked to the locking portion 5c of the rotating member 5 and the other end Sb is locked to the locking portion 1d of the fixing member 1. Therefore, when the shaft member L and the rotating member 5 are rotated by rotating the throttle lever 2, the rotating member 5 is urged toward an initial position by the return spring S.

Further, as illustrated in FIG. 13, a connecting member 12 is attached to the rotating member 5 by a pair of mounting screws n and a mounting member 6 is attached to the connecting member 12. The mounting member 6 holds the magnet M. As illustrated in FIG. 13, the mounting member 6 is configured to include an accommodation recess portion 6a into which the magnet M can be fitted and a pair of locking claws 6b formed so as to face each other at an opening edge of the accommodation recess portion 6a.

The magnet M is fitted and attached to the accommodation recess portion 6a of the mounting member 6 and is rotatable together with the shaft member L in response to the rotational operation of the throttle lever 2. As illustrated in FIG. 13, the magnet M is configured to have a through hole Ma and a notch portion Mb formed in an upper surface edge. The magnet M is accommodated in the accommodation recess portion 6a of the mounting member 6 and is prevented from coming off by pressing the locking claw 6b against the notch portion Mb.

Figure 4:
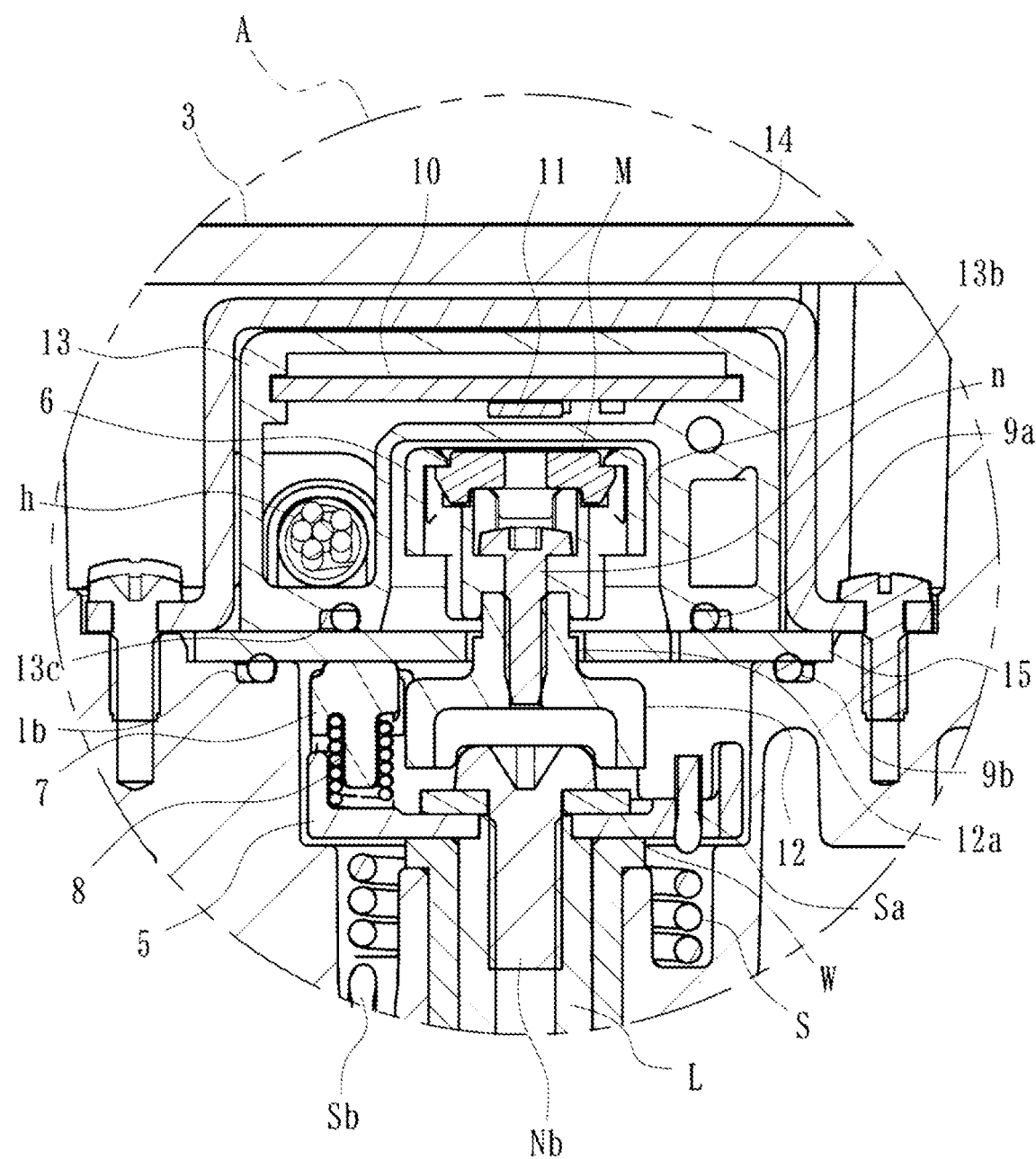
FIG. 4 is an enlarged view of a part A of FIG. 3.

As illustrated in FIGS. 4 and 13, the connecting member 12 connects the mounting member 6 to which the magnet M is attached and the rotating member 5 which rotates with the operation of the throttle lever 2, and can rotate the mounting member 6 in conjunction with the rotating operation of the throttle lever 2. The connecting member 12 is integrally formed with a convex portion 12a for fitting and fixing the mounting member 6 at a protruding end portion. The convex portion 12a is set to a predetermined height dimension and can be inserted into an insertion hole 15b of second magnetic shielding unit 15 as illustrated in FIG. 4.

Figure 11:
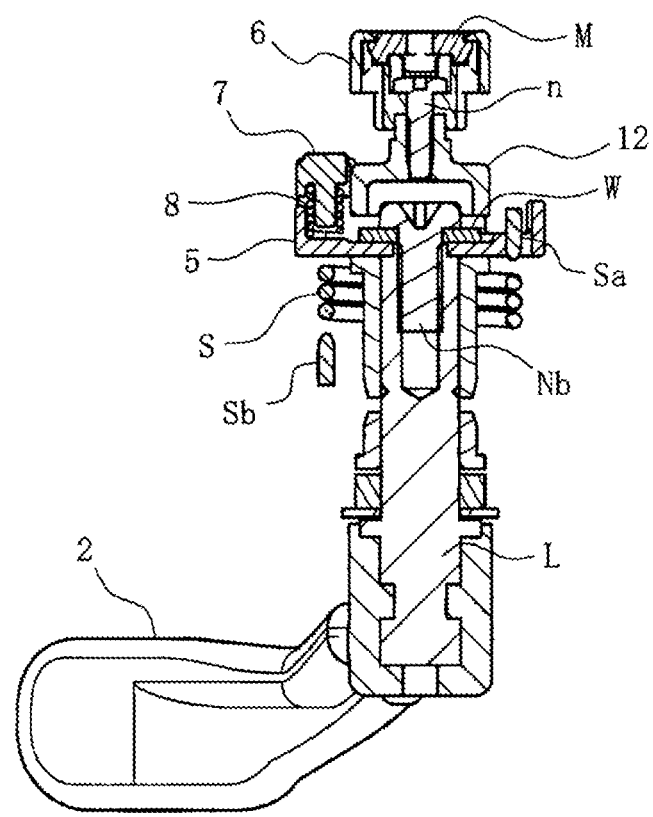
FIG. 11 is a cross-sectional view taken along the line XI-XI of FIG. 10.

As described above, in the present embodiment, the throttle lever 2, the shaft member L, the rotating member 5, the connecting member 12, the mounting member 6, the magnet M, and the return spring S are assembled to form an integrated component Y, as illustrated in FIGS. 9 to 11. Therefore, the integrated component Y is rotated with respect to the fixing member 1 by rotating the throttle lever 2 and the integrated component Y is urged toward the initial position by the return spring S. Therefore, by loosening an operating force on the throttle lever 2, the throttle lever 2 returns to the initial position.

Figure 7:
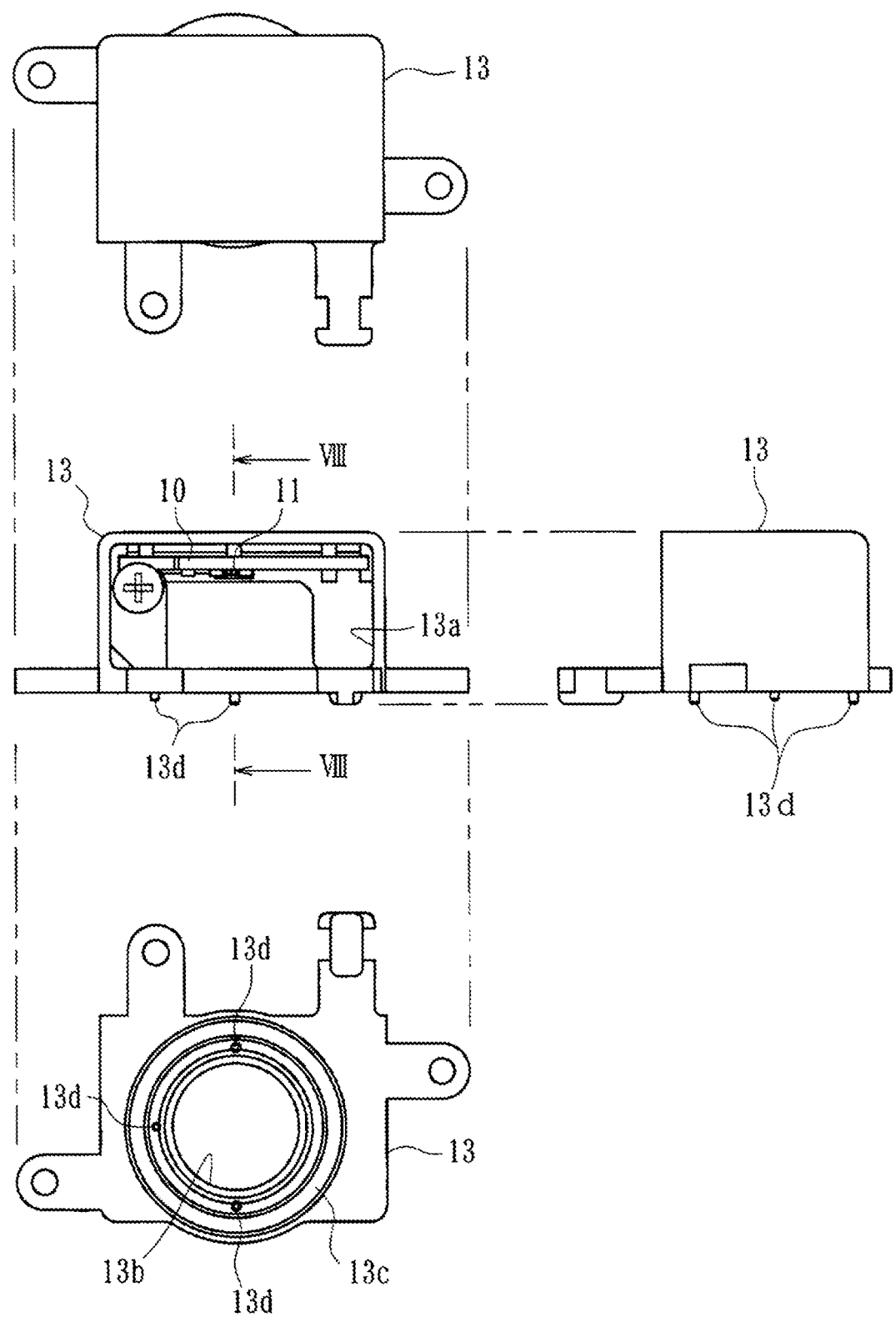
FIG. 7 is a four-view orthographic projection illustrating an accommodation case of the throttle operating device.
Figure 8:
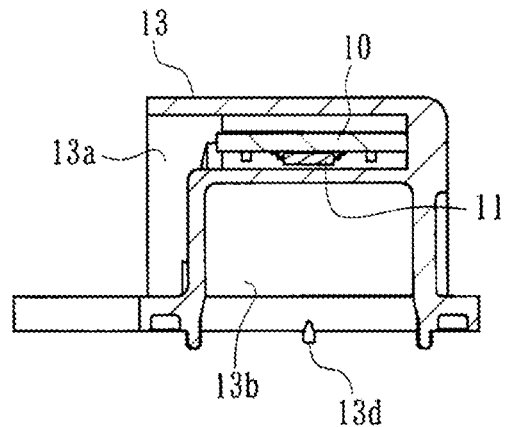
FIG. 8 is a cross-sectional view taken along the line VIII-VIII of FIG. 7.

The accommodation case 13 is made of a resin molded part formed with a recess portion 13b rotatably accommodating the magnet M while the detection sensor 11 is accommodated inside the recess portion. As illustrated in FIGS. 7 and 8, the accommodation case 13 is configured to include an accommodation portion 13a for accommodating the detection sensor 11 and a substrate 10, the recess portion 13b which allows the magnet M and the mounting member 6 to rotate while accommodating the mounting member 6 which holds the magnet M, a mounting groove portion 13c formed along the opening edge of the recess portion 13b, and a plurality of (three in the present embodiment) fitting convex portions 13d formed at predetermined positions on a bottom surface side.

The accommodation portion 13a consists of an internal space which opens toward the side of the accommodation case 13. The accommodation portion 13a accommodates the substrate 10 on which the detection sensor 11 is formed and the detection sensor 11 and the substrate 10 are waterproofed by being filled with a predetermined resin. The recess portion 13b consists of a cylindrical space opened on a bottom surface side of the accommodation case 13. The recess portion 13b is configured to accommodate the mounting member 6 holding the magnet M and to allow rotation of the magnet M and the mounting member 6.

That is, in the present embodiment, when the integrated component Y (see FIGS. 9 to 11) is assembled to the fixing member 1 and the mounting member 6 is inserted into the recess portion 13b, the detection sensor 11 accommodated in the accommodation portion 13 is located on a rotation axis of the magnet M held by the mounting member 6. As a result, in the present embodiment, when the throttle lever 2 is rotated, a magnetic change accompanying the rotation of the magnet M can be detected with high accuracy, so that a rotational operation angle can be detected more accurately.

The detection sensor 11 can detect the rotational operation angle of the throttle lever 2. In the present embodiment, the detection sensor 11 is composed of an angle sensor which detects the magnetic change of the magnet M and detects the rotation angle thereof. That is, in the present embodiment, when the magnet M rotates with the rotational operation of the throttle lever 2, the detection sensor 11 detects the magnetic change of the magnet M due to the rotation and the rotational operation angle of the throttle lever 2 can be detected.

The present embodiment is configured such that, when the detection sensor 11 detects the rotational operation angle of the throttle lever 2, the detection signal is transmitted to an engine control unit (ECU) provided in the vehicle via a wiring h connected to the substrate 10 and an engine (drive source) of the vehicle is controlled based on the rotational operation angle of the throttle lever 2.

Here, the present embodiment includes magnetic shielding unit (first magnetic shielding unit 14 and second magnetic shielding unit 15) which can cover the periphery of the magnet M and the detection sensor 11 to shield magnetism from the outside. Such a magnetic shielding unit is disposed in the fixing member 1. As illustrated in FIGS. 3 to 5, the magnetic shielding unit is composed of the first magnetic shielding unit 14 having a case shape and the second magnetic shielding unit 15 having the plate shape and is attached by being screwed to the fixing member 1 while covering the accommodation case 13.

Figure 14:
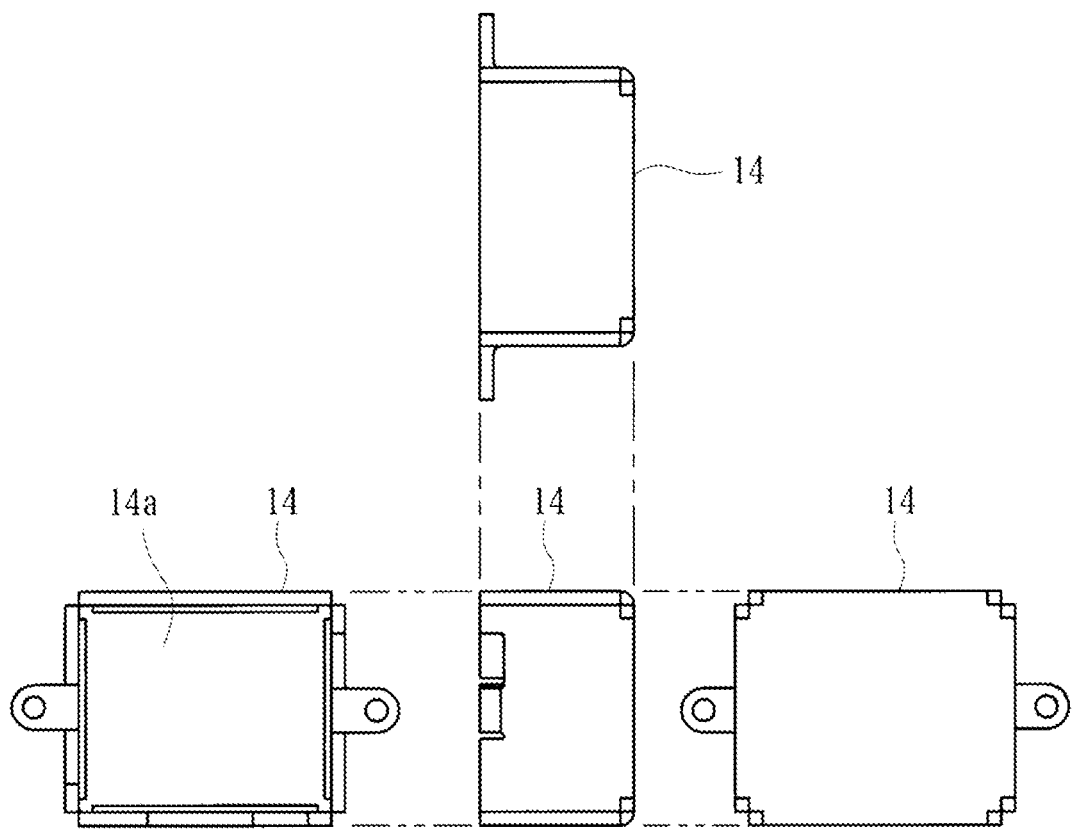
FIG. 14 is a four-view orthographic projection illustrating magnetic shielding unit (first magnetic shielding unit) of the throttle operating device.
Figure 15:
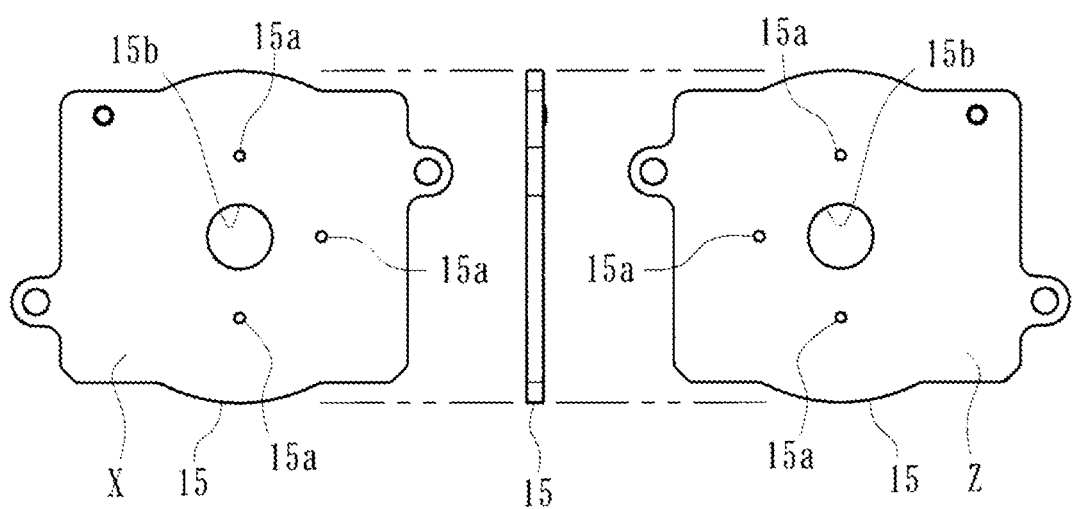
FIG. 15 is a three-view orthographic projection illustrating a magnetic shielding unit (second magnetic shielding unit) of the throttle operating device.
Figure 16:
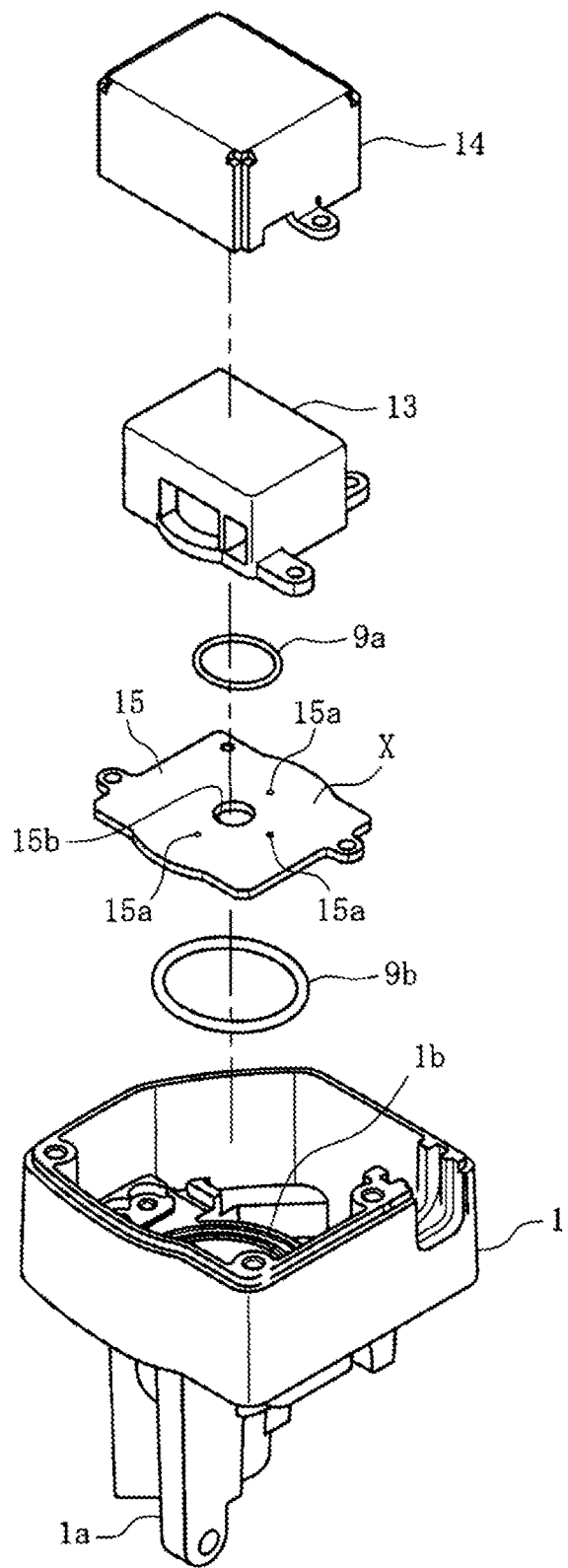
FIG. 16 is an exploded perspective view illustrating an assembled state of the fixing member, the accommodation case, and the magnetic shielding unit of the throttle operating device.
Figure 17:
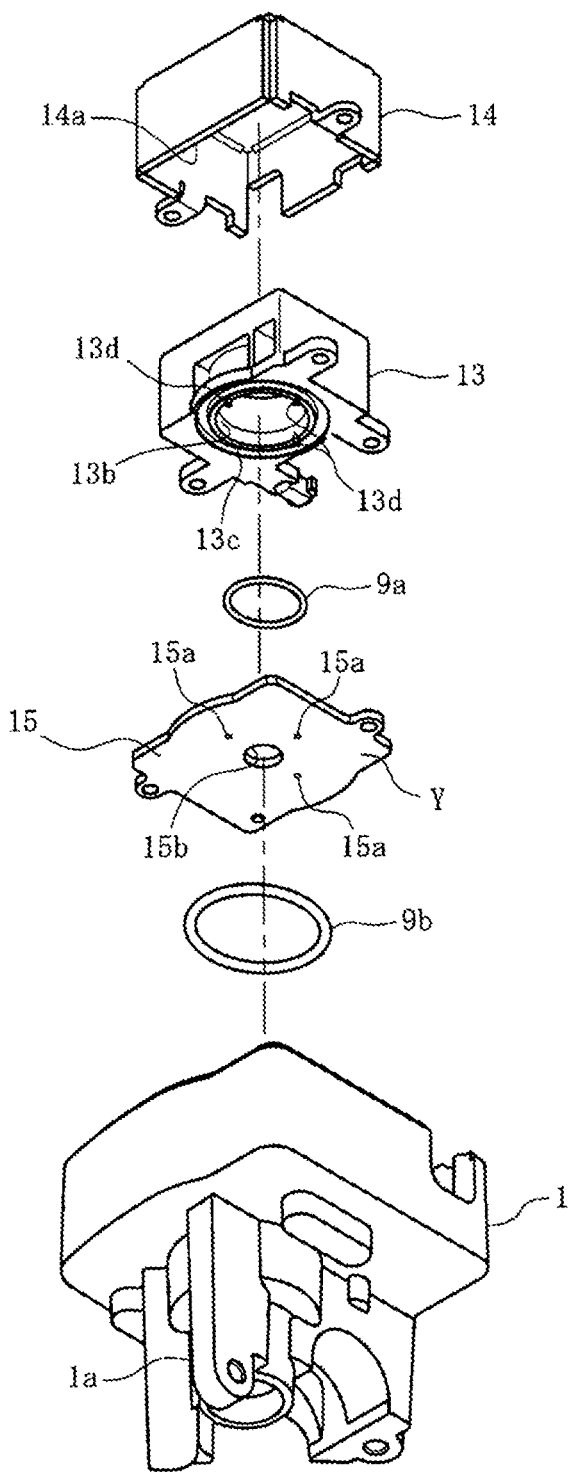
FIG. 17 is an exploded perspective view illustrating the assembled state of the fixing member, the accommodation case, and the magnetic shielding unit of the throttle operating device.

Specifically, the magnetic shielding unit according to the present embodiment is configured to include the first magnetic shielding unit 14 made of a ferromagnetic material such as iron, which is opened on one side (downward in the present embodiment) and has an accommodation space 14a formed inside as illustrated in FIG. 14, and the second magnetic shielding unit 15 made of a ferromagnetic material such as iron, which covers the opening of the first magnetic shielding unit 14 as illustrated in FIG. 15. Then, as illustrated in FIGS. 16 and 17, by closing the opening of the first magnetic shielding unit 14 with the second magnetic shielding unit 15 to close the accommodation space 14a, the accommodation case 13 is accommodated in the accommodation space 14a. The accommodation case 13, the first magnetic shielding unit 14, and the second magnetic shielding unit 15 are respectively fixed to the fixing member 1 by screwing.

The second magnetic shielding unit 15 is configured to include, as illustrated in FIG. 15, a fitting recess portion 15a in which the fitting convex portion 13d formed in the accommodation case 13 can be fitted and an insertion hole 15b through which the convex portion 12a (see FIG. 5) of the connecting member 12 is inserted so as to be rotatable. As illustrated in FIGS. 3 to 5, the insertion hole 15b is capable of inserting the convex portion 12a of the connecting member 12 when the integrated component Y (see FIGS. 9 to 11) is assembled to the fixing member 1. Also, the insertion hole 15b makes the integrated component Y rotatable in response to the rotational operation of the throttle lever 2.

The fitting recess portion 15a is composed of a hole formed at a position corresponding to the fitting convex portion 13d. In a state where the bottom surface of the accommodation case 13 abuts on one surface X of the second magnetic shielding unit 15, the fitting recess portions 15a can be positioned by fitting the fitting convex portions 13d of the accommodation case 13 respectively. In the present embodiment, the fitting convex portion 13d is formed in the accommodation case 13 and the fitting recess portion 15a is formed in the second magnetic shielding unit 15. However, a fitting recess portion may be formed in the accommodation case 13 and a fitting convex portion may be formed in the second magnetic shielding unit 15 for positioning.

Further, in the present embodiment, as illustrated in FIGS. 16 and 17, a first sealing member 9a which is attached to an abutment surface between the accommodation case 13 and the second magnetic shielding unit 15 and can perform sealing and the second sealing member 9b which is attached to an abutment surface between the second magnetic shielding unit 15 and the fixing member 1 and can perform sealing are respectively attached.

The first sealing unit 9a is composed of an O-ring which can be fitted and attached to the mounting groove portion 13c (see FIGS. 7 and 17) formed on the abutment surface with the second magnetic shielding unit 15 in the accommodation case 13. The first sealing unit 9a can perform sealing by a pressure contact force between the accommodation case 13 and the second magnetic shielding unit 15. Further, the second sealing unit 9b is composed of an O-ring which can be fitted and attached to the mounting groove portion 1b (see FIGS. 6 and 16) formed on the abutment surface with the second magnetic shielding unit 15 in the fixing member 1. The second sealing unit 9b can perform sealing by a pressure contact force between the fixing member 1 and the second magnetic shielding unit 15.

Further, the throttle operating device according to the present embodiment is provided with the resistance force applying unit 7 which can generate friction during the rotational operation of the throttle lever 2 to apply a resistance force. As illustrated in FIG. 13, such a resistance force applying unit 7 is attached to the mounting portion 5a of the rotating member 5 and is composed of a resin member urged upward by a coil spring 8. When the rotating member 5 rotates with the rotational operation of the throttle lever 2, the resistance force applying unit 7 can rotate together with the rotating member 5.

Specifically, in the resistance force applying unit 7, as illustrated in FIG. 13, a protruding end surface 7a, a boss portion 7b, and protruding portions 7c are integrally formed. The protruding end surface 7a is composed of a plane formed at a protruding end of the resistance force applying unit 7. The tip surface 7a can cause friction by sliding on an outer peripheral surface (sliding surface Z in FIG. 15) of the second magnetic shielding unit 15. The boss portion 7b has a protruding shape formed on a lower surface of the resistance force applying unit 7 and is capable of holding the coil spring 8. Further, the protruding portions 7c are composed of a pair of bulging portions formed on side surfaces of the resistance force applying unit 7. By matching the protruding portion 7c with a holding groove 5aa (see FIG. 13) formed in the mounting portion 5a of the rotating member 5, the resistance force applying unit 7 can be positioned and the displacement of the resistance force applying unit 7 can be guided.

However, the resistance force applying unit 7 is urged by the coil spring 8 toward the sliding surface Z (outer peripheral surface) of the second magnetic shielding unit 15, and as illustrated in FIGS. 3 and 4, the protruding end surface 7a is in contact with the sliding surface Z. Further, when the rotating member 5 rotates with the rotational operation of the throttle lever 2 and the resistance force applying unit 7 pivots together with the rotating member 5, the protruding end surface 7a can slide on the sliding surface Z.

According to the present embodiment, the throttle operating device includes the magnetic shielding units (14 and 15) which are disposed in the fixing member 1 and can cover the periphery of the magnet M and the detection sensor 11 to shield the magnetism from the outside, and thus it is possible to suppress erroneous detection of the detection sensor 11 due to the influence of magnetism from the outside and accurately detect the rotational operation angle of the throttle lever 2.

Further, according to the present embodiment, the throttle operating device includes the accommodation case 13 formed with the recess portion 13b rotatably accommodating the magnet M while the detection sensor 11 is accommodated inside the recess portion 13b and the magnetic shielding units (14 and 15) are attached to the fixing member 1 in a state of covering the accommodation case 13. Therefore, while maintaining the positioning of the magnet M and the detection sensor 11 with the accommodation case 13, the influence of magnetism from the outside can be suppressed by the magnetic shielding units (14 and 15).

Further, the magnetic shielding units (14 and 15) according to the present embodiment includes the first magnetic shielding unit 14 in which one side is opened and the accommodation space is formed and the second magnetic shielding unit 15 which covers the opening of the first magnetic shielding unit 14 and the accommodation case 13 is disposed in the accommodation space 14a of the first magnetic shielding unit 14 closed by the second magnetic shielding unit 15. Therefore, the accommodation case 13 can be easily disposed inside the magnetic shielding units (14 and 15).

Furthermore, according to the present embodiment, the throttle operating device includes the connecting member 12 which connects the mounting member 6 to which the magnet M is attached and the rotating member 5 which rotates with the operation of the throttle lever 2, and is configured to rotate the magnet M by transmitting a rotational operation force of the throttle lever 2 to the mounting member 6 and the second magnetic shielding unit 15 is formed with the insertion hole 15b through which the connecting member 12 is inserted to be rotatable. Therefore, the rotation of the magnet M accompanying the rotational operation of the throttle lever 2 can be smoothly performed and the magnetic shielding by the magnetic shielding units (14 and 15) can be maintained.

In addition, in the accommodation case 13 and the second magnetic shielding unit 15 according to the present embodiment, the fitting convex portion 13d and the fitting recess portion 15a which can be positioned by being fitted to each other are formed. Therefore, the accommodation case 13 can be accurately positioned with respect to the second magnetic shielding unit 15 and the magnet M and the detection sensor 11 can be easily assembled so as to be in predetermined relative positions.

Further, according to the present embodiment, the throttle operating device includes the first sealing unit 9a which is attached to the abutment surface between the accommodation case 13 and the second magnetic shielding unit 15, and is configured to perform sealing by the pressure contact force between the accommodation case 13 and the second magnetic shielding unit 15 and the second sealing unit 9b which is attached to the abutment surface between the second magnetic shielding unit 15 and the fixing member 1, and is configured to perform sealing by the pressure contact force between the second magnetic shielding unit 15 and the fixing member 1. Therefore, the sealing force of the first sealing unit 9a and the second sealing unit 9b can be maintained by utilizing the magnetic shielding units (14 and 15).

Furthermore, according to the present embodiment, the mounting groove portions (13c and 1b) are respectively formed on the abutment surface with the second magnetic shielding unit 15 in the accommodation case 13 and the abutment surface with the second magnetic shielding unit 15 in the fixing member 1 and the first sealing unit 9a and the second sealing unit 9b are respectively fitted and attached to these mounting groove portions (13c and 1b). Therefore, the first sealing unit 9a and the second sealing unit 9b can be stably held in the mounting groove portions (13c and 1b) and mounting groove portions for fitting the first sealing unit 9a and the second sealing unit 9b can be eliminated from the magnetic shielding unit (second magnetic shielding unit 15 in the present embodiment).

Further, the throttle operating device includes the resistance force applying unit 7 which is configured to generate friction by sliding on the sliding surface Z during the rotational operation of the throttle lever 2 to apply a resistance force and the sliding surface Z includes the outer peripheral surface of the magnetic shielding unit (second magnetic shielding unit 15 in the present embodiment). Therefore, the outer peripheral surface of the magnetic shielding unit (second magnetic shielding unit 15) can be used to apply a resistance force by the resistance force applying unit 7. By providing the resistance force applying unit 7 which can generate friction and apply a resistance force during the rotational operation of the throttle lever 2, the operability at the time of the rotational operation of the throttle lever 2 can be improved and the operation feeling can be made similar, compared with the one of the related art in which an operation of a throttle lever is transmitted to an engine side via an operation wire.

Figure 18:
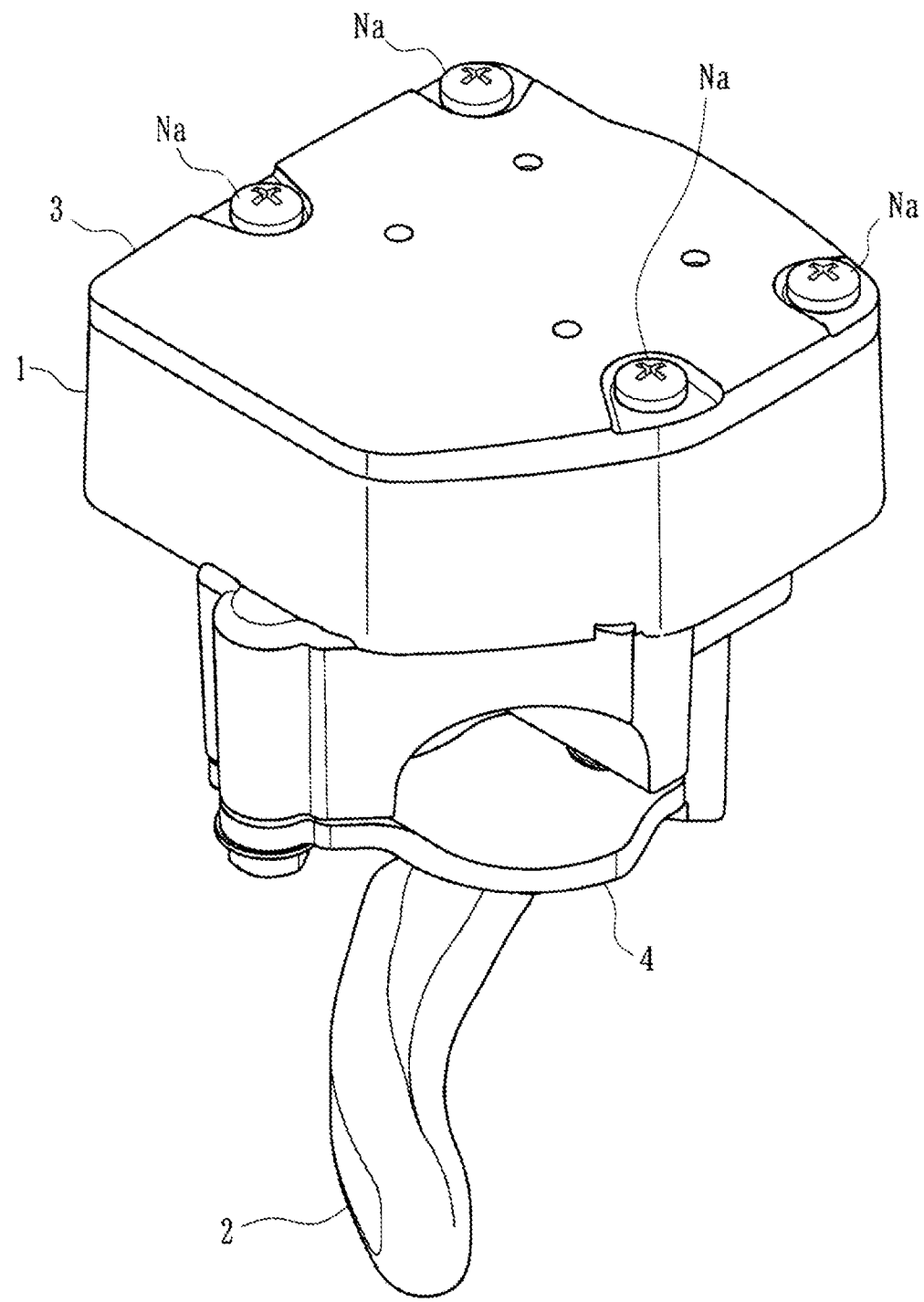
FIG. 18 is an overall perspective view illustrating a throttle operating device according to another embodiment of the present disclosure.
Figure 19:
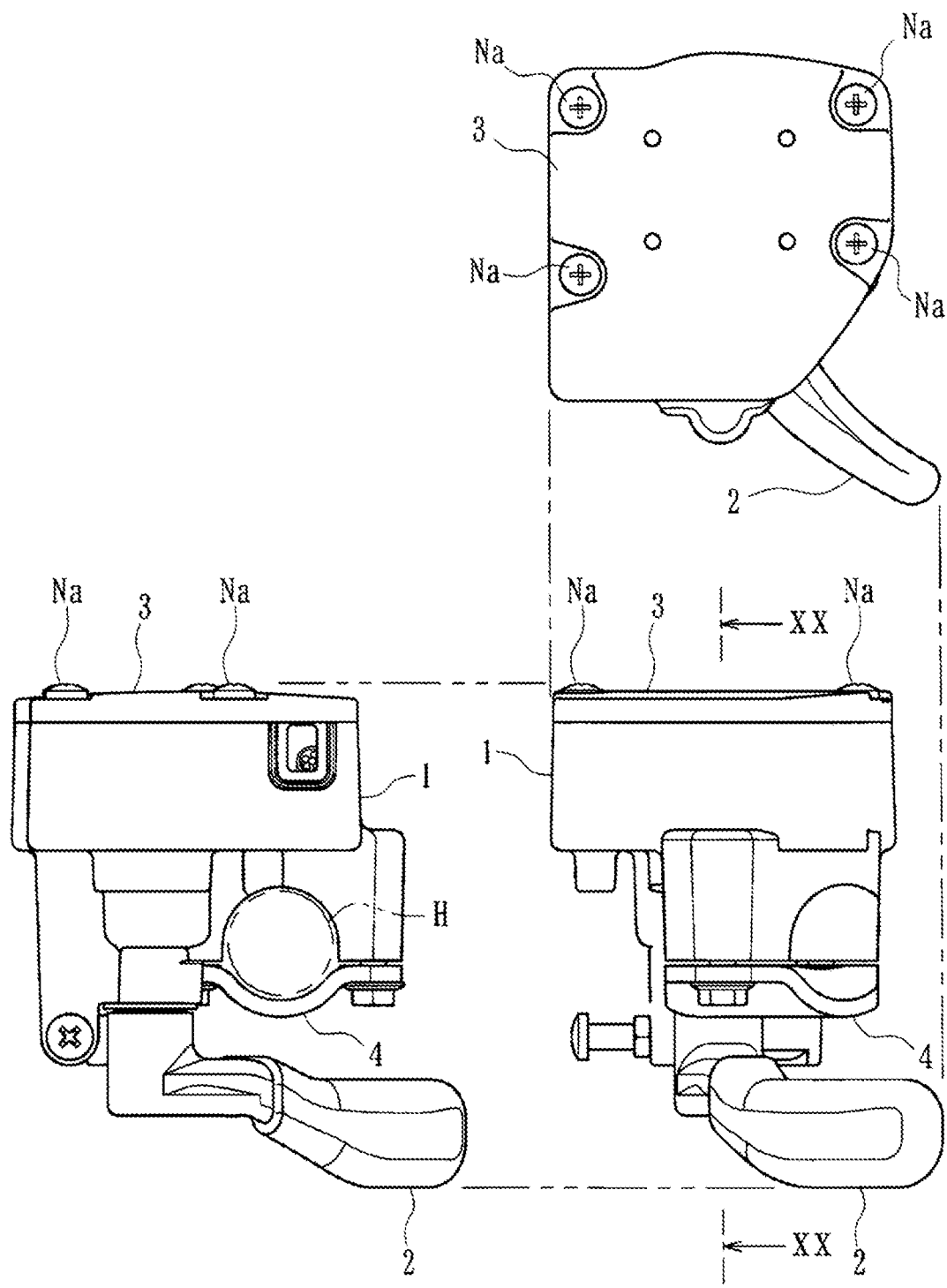
FIG. 19 is a three-view orthographic projection illustrating the throttle operating device.
Figure 20:
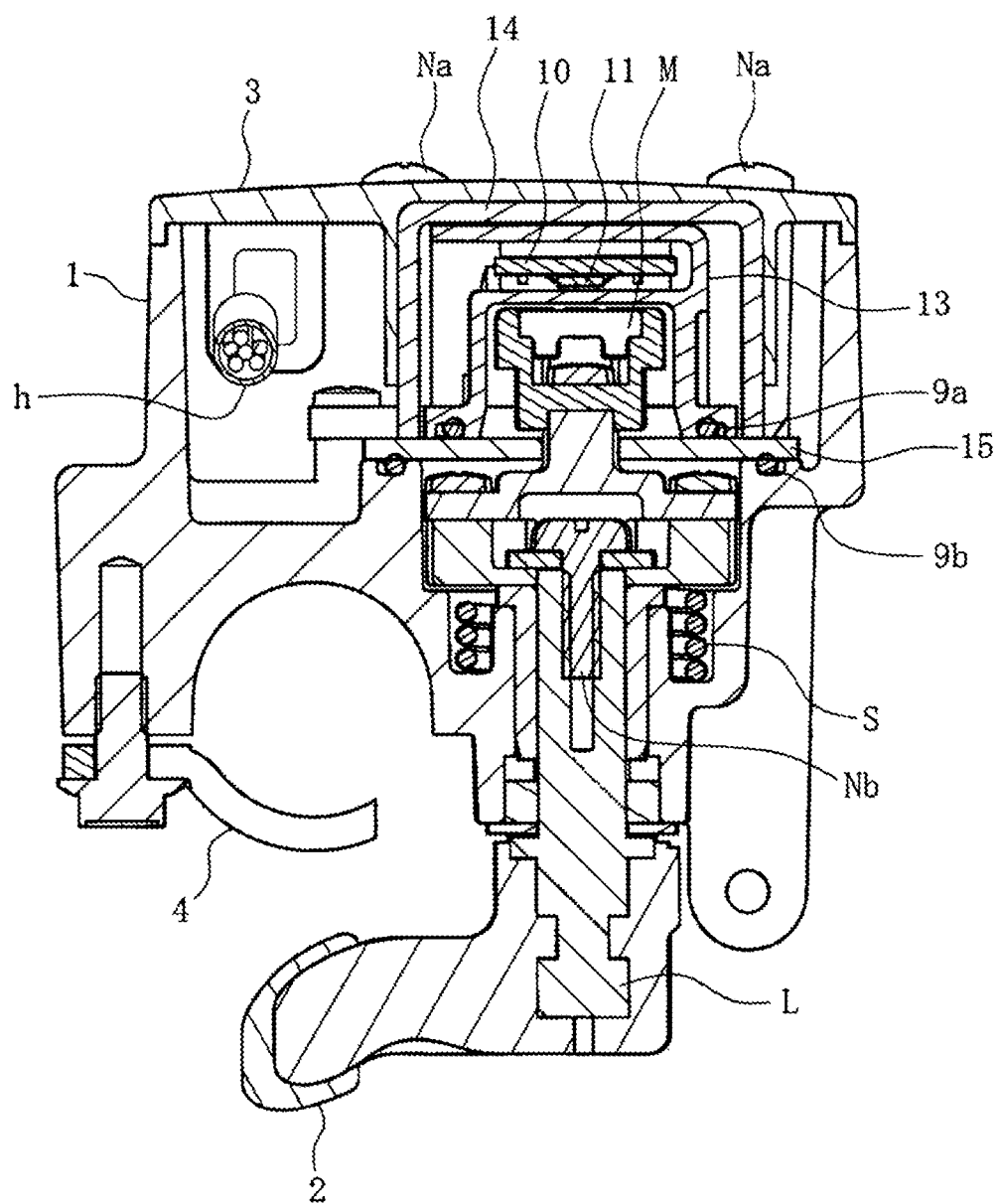
FIG. 20 is a cross-sectional view taken along the line XX-XX of FIG. 19.

Although the present embodiment is described above, the present disclosure is not limited to this. For example, as illustrated in FIGS. 18 to 22, the cover member 3 covering the opening of the fixing member 1 may be provided and the magnetic shielding unit 14 may be insert-molded into the cover member 3. That is, as illustrated in FIGS. 18 to 20, such a throttle operating device includes the magnetic shielding units (14 and 15) capable of covering the periphery of the magnet M and the detection sensor 11 to shield magnetism from the outside. The same components as those in the previous embodiment are designated by the same reference numerals and letters.

Figure 21:
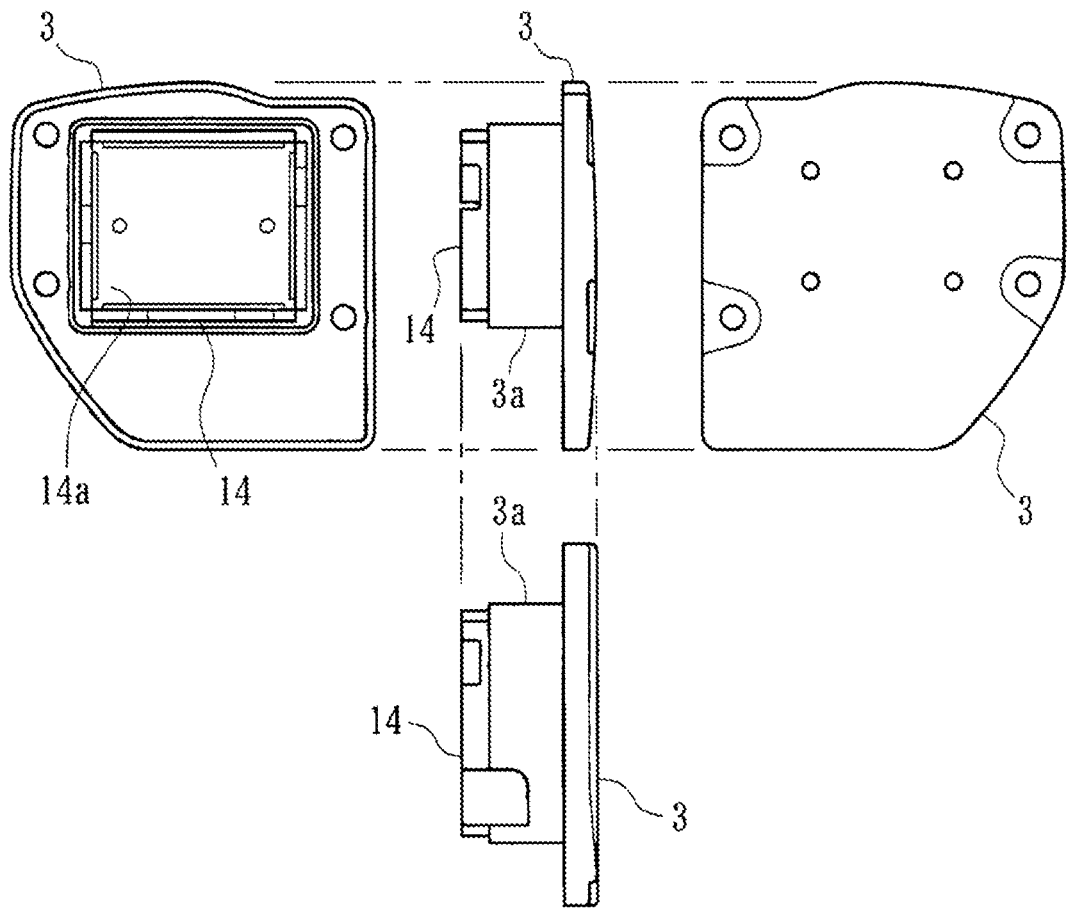
FIG. 21 is a four-view orthographic projection illustrating magnetic shielding unit integrally formed with a cover member of the throttle operating device.
Figure 22:
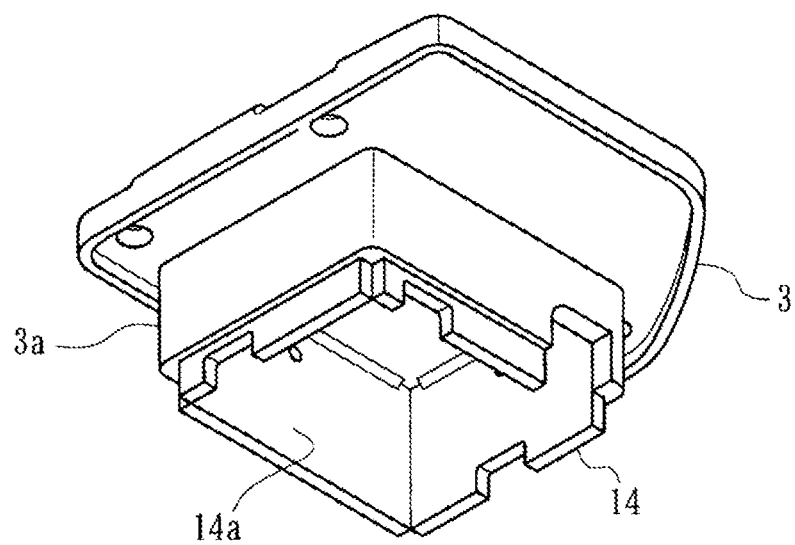
FIG. 22 is a perspective view illustrating the magnetic shielding unit integrally formed with the cover member of the throttle operating device.

Then, as illustrated in FIGS. 21 and 22, a protruding portion 3a which follows the side dimension and side shape of the first magnetic shielding unit 14 is formed in the cover member 3, and when the cover member 3 is molded, the first magnetic shielding unit 14 is insert-molded and integrated. In this way, the cover member 3 which covers the opening of the fixing member 1 is provided and the first magnetic shielding unit 14 is insert-molded into the cover member 3. Therefore, the cover member 3 and the first magnetic shielding unit 14 can be integrated and treated as one component. As a result, an assembly work can be easily performed.

Further, the present embodiment is not limited to the embodiment described above and may not include the resistance force applying unit 7. Alternatively, the resistance force applying unit 7 may slide on a surface (for example, a surface of a separately disposed metal member) of another portion different from the second magnetic shielding unit 15. Further, the dimensions and shapes of the first magnetic shielding unit 14 and the second magnetic shielding unit 15 may be different from those in the embodiment described above.

If the gist is the same as that of the invention, it can be applied to those having a different appearance shape or those to which other functions are added.

According to an aspect of the present disclosure, there is provided a throttle operating device including: a fixing member which is fixed to a vicinity of a grip formed at a tip of a handlebar of a vehicle; a throttle lever which is attached and extending from the fixing member, and the throttle lever being configured to be pivoted while the grip is gripped; a magnet which is configured to rotate in response to a rotational operation of the throttle lever; and a detection sensor configured to detect a rotational operation angle of the throttle lever based on a magnetic change of the magnet rotating in response to the throttle lever, in which: a drive source of the vehicle is configured to be controlled based on the rotational operation angle of the throttle lever detected by the detection sensor; and a magnetic shielding unit is disposed in the fixing member and configured to cover a periphery of the magnet and the detection sensor to shield magnetism from the outside.

According to the above aspect of the present disclosure, a throttle operating device includes the magnetic shielding unit which is disposed in the fixing member and configured to cover the periphery of the magnet and the detection sensor to shield the magnetism from the outside, and thus it is possible to suppress erroneous detection of the detection sensor due to the influence of magnetism from the outside and accurately detect the rotational operation angle of the throttle lever.

The throttle operating device may further include: an accommodation case formed with a recess portion rotatably accommodating the magnet while the detection sensor is accommodated inside the recess portion, in which the magnetic shielding unit may be attached to the fixing member in a state of covering the accommodation case.

According to the above, the throttle operating device further includes the accommodation case formed with the recess portion rotatably accommodating the magnet while the detection sensor is accommodated inside the recess portion, and the magnetic shielding unit is attached to the fixing member in a state of covering the accommodation case. Therefore, while maintaining the positioning of the magnet and the detection sensor with the accommodation case, the influence of magnetism from the outside can be suppressed by the magnetic shielding unit.

In the throttle operating device, the magnetic shielding unit may include: a first magnetic shielding unit in which one side is opened and an accommodation space is formed; and a second magnetic shielding unit which covers an opening of the first magnetic shielding unit, and the accommodation case is disposed in the accommodation space of the first magnetic shielding unit closed by the second magnetic shielding unit.

According to the above, the magnetic shielding unit includes the first magnetic shielding unit in which one side is opened and the accommodation space is formed and the second magnetic shielding unit which covers the opening of the first magnetic shielding unit, and the accommodation case is disposed in the accommodation space of the first magnetic shielding unit closed by the second magnetic shielding unit. Therefore, the accommodation case can be easily disposed inside the magnetic shielding unit.

The throttle operating device may further include: a connecting member which connects a mounting member to which the magnet is attached and a rotating member which rotates with an operation of the throttle lever, and is configured to rotate the mounting member in conjunction with the rotational operation of the throttle lever, in which the second magnetic shielding unit may be formed with an insertion hole through which the connecting member is inserted to be rotatable.

According to the above, the throttle operating device further includes the connecting member which connects the mounting member to which the magnet is attached and the rotating member which rotates with the operation of the throttle lever, and is configured to rotate the mounting member in conjunction with the rotational operation of the throttle lever, and the second magnetic shielding unit is formed with the insertion hole through which the connecting member is inserted so as to be rotatable. Therefore, the rotation of the magnet accompanying the rotational operation of the throttle lever can be smoothly performed and the magnetic shielding by the magnetic shielding unit can be maintained.

In the throttle operating device, a fitting convex portion and a fitting recess portion may be formed in the accommodation case and the second magnetic shielding unit, the fitting convex portion and the fitting recess portion being configured to be positioned by being fitted to each other.

According to the above, in the accommodation case and the second magnetic shielding unit, the fitting convex portion and the fitting recess portion which can be positioned by being fitted to each other are formed. Therefore, the accommodation case can be accurately positioned with respect to the second magnetic shielding unit and the magnet and the detection sensor can be easily assembled so as to be in predetermined relative positions.

The throttle operating device may further include: a first sealing unit which is attached to an abutment surface between the accommodation case and the second magnetic shielding unit, and is configured to perform sealing by a pressure contact force between the accommodation case and the second magnetic shielding unit; and a second sealing unit which is attached to an abutment surface between the second magnetic shielding unit and the fixing member, and is configured to perform sealing by a pressure contact force between the second magnetic shielding unit and the fixing member.

According to the above, the throttle operating device further includes the first sealing unit which is attached to the abutment surface between the accommodation case and the second magnetic shielding unit, and is configured to perform sealing by the pressure contact force between the accommodation case and the second magnetic shielding unit, and the second sealing unit which is attached to the abutment surface between the second magnetic shielding unit and the fixing member, and is configured to perform sealing by the pressure contact force between the second magnetic shielding unit and the fixing member. Therefore, the sealing force of the first sealing unit and the second sealing unit can be maintained by utilizing the magnetic shielding unit.

In the throttle operating device, mounting groove portions may be respectively formed on the abutment surface with the second magnetic shielding unit in the accommodation case and the abutment surface with the second magnetic shielding unit in the fixing member; and the first sealing unit and the second sealing unit may be respectively fitted and attached to the mounting groove portions.

According to the above, the mounting groove portions are respectively formed on the abutment surface with the second magnetic shielding unit in the accommodation case and the abutment surface with the second magnetic shielding unit in the fixing member and the first sealing unit and the second sealing unit are respectively fitted and attached to these mounting groove portions. Therefore, the first sealing unit and the second sealing unit can be stably held in the mounting groove portions and mounting groove portions for fitting the first sealing unit and the second sealing unit can be eliminated from the magnetic shielding unit.

The throttle operating device may further include: a resistance force applying unit which is configured to generate friction by sliding on a sliding surface during the rotational operation of the throttle lever to apply a resistance force, in which the sliding surface may includes an outer peripheral surface of the magnetic shielding unit.

According to the above, the throttle operating device further includes the resistance force applying unit which is configured to generate friction by sliding on the sliding surface during the rotational operation of the throttle lever to apply a resistance force and the sliding surface includes the outer peripheral surface of the magnetic shielding unit. Therefore, the outer peripheral surface of the magnetic shielding unit can be used to apply a resistance force by the resistance force applying unit.

In the throttle operating device, a cover member may be provided to cover an opening of the fixing member; and the magnetic shielding unit may be insert-molded into the cover member.

According to the above, the cover member is provided to cover the opening of the fixing member and the magnetic shielding unit is insert-molded into the cover member. Therefore, the cover member and the magnetic shielding unit can be integrated and treated as one component. As a result, an assembly work can be easily performed.

What is claimed is:

1. A throttle operating device comprising:
    a fixing member which is fixed to a vicinity of a grip formed at a tip of a handlebar of a vehicle;
    a throttle lever which is attached and extending from the fixing member, and the throttle lever being configured to be pivoted while the grip is gripped;
    a magnet which is configured to rotate in response to a rotational operation of the throttle lever; and
    a detection sensor configured to detect a rotational operation angle of the throttle lever based on a magnetic change of the magnet rotating in response to the throttle lever, wherein:
    a drive source of the vehicle is configured to be controlled based on the rotational operation angle of the throttle lever detected by the detection sensor; and
    a magnetic shielding unit is disposed in the fixing member and configured to cover a periphery of the magnet and the detection sensor to shield magnetism from the outside.

2. The throttle operating device according to claim 1, further comprising:
    an accommodation case formed with a recess portion rotatably accommodating the magnet while the detection sensor is accommodated inside the recess portion, wherein
    the magnetic shielding unit is attached to the fixing member in a state of covering the accommodation case.

3. The throttle operating device according to claim 2, wherein
    the magnetic shielding unit includes:
        a first magnetic shielding unit in which one side is opened and an accommodation space is formed; and
        a second magnetic shielding unit which covers an opening of the first magnetic shielding unit, and
    the accommodation case is disposed in the accommodation space of the first magnetic shielding unit closed by the second magnetic shielding unit.

4. The throttle operating device according to claim 3, further comprising:
    a connecting member which connects a mounting member to which the magnet is attached and a rotating member which rotates with an operation of the throttle lever, and is configured to rotate the mounting member in conjunction with the rotational operation of the throttle lever, wherein
    the second magnetic shielding unit is formed with an insertion hole through which the connecting member is inserted to be rotatable.

5. The throttle operating device according to claim 4, wherein
    a fitting convex portion and a fitting recess portion are formed in the accommodation case and the second magnetic shielding unit, the fitting convex portion and the fitting recess portion being configured to be positioned by being fitted to each other.

6. The throttle operating device according to claim 3, further comprising:
    a first sealing unit which is attached to an abutment surface between the accommodation case and the second magnetic shielding unit, and is configured to perform sealing by a pressure contact force between the accommodation case and the second magnetic shielding unit; and
    a second sealing unit which is attached to an abutment surface between the second magnetic shielding unit and the fixing member, and is configured to perform sealing by a pressure contact force between the second magnetic shielding unit and the fixing member.

7. The throttle operating device according to claim 6, wherein:
    mounting groove portions are respectively formed on the abutment surface with the second magnetic shielding unit in the accommodation case and the abutment surface with the second magnetic shielding unit in the fixing member; and
    the first sealing unit and the second sealing unit are respectively fitted and attached to the mounting groove portions.

8. The throttle operating device according to claim 1, further comprising:
    a resistance force applying unit which is configured to generate friction by sliding on a sliding surface during the rotational operation of the throttle lever to apply a resistance force, wherein
    the sliding surface includes an outer peripheral surface of the magnetic shielding unit.

9. The throttle operating device according to claim 1, wherein:
    a cover member is provided to cover an opening of the fixing member; and
    the magnetic shielding unit is insert-molded into the cover member.

* * * * *

UNITED STATES PATENT AND TRADEMARK OFFICE
CERTIFICATE OF CORRECTION

PATENT NO. : 11,492,984 B2
APPLICATION NO. : 17/539859
DATED : November 8, 2022
INVENTOR(S) : Yukio Oshiro It is certified that error appears in the above-identified patent and that said Letters Patent is hereby corrected as shown below:

In the Specification

Column 2, Line 3, "along the line of" should read -- along the line III-III of --

Signed and Sealed this
Twenty-fourth Day of October, 2023

Katherine Kelly Vidal
*Director of the United States Patent and Trademark Office*